US012437656B2

(12) United States Patent
Vos et al.

(10) Patent No.: US 12,437,656 B2
(45) Date of Patent: Oct. 7, 2025

(54) ALTERNATE DESTINATION MANAGEMENT AND SELECTION

(71) Applicant: THE BOEING COMPANY, Arlington, VA (US)

(72) Inventors: Maxim Constantijn Vos, Madrid (ES); Daniel Ramiro Rebollo, Madrid (ES); David Rubio Mota, Madrid (ES)

(73) Assignee: The Boeing Company, Arlington, VA (US)

( * ) Notice: Subject to any disclaimer, the term of this patent is extended or adjusted under 35 U.S.C. 154(b) by 116 days.

(21) Appl. No.: 18/331,795

(22) Filed: Jun. 8, 2023

(65) Prior Publication Data

US 2024/0412646 A1    Dec. 12, 2024

(51) Int. Cl.
*G08G 5/34* (2025.01)

(52) U.S. Cl.
CPC ..................... *G08G 5/34* (2025.01)

(58) Field of Classification Search
CPC ... G08G 5/34; G08G 5/21; G08G 5/58; G01C 23/00
See application file for complete search history.

(56) References Cited

U.S. PATENT DOCUMENTS

| | | |
|---|---|---|
| 8,565,944 B1 | 10/2013 | Gershzohn |
| 8,666,649 B2 | 3/2014 | Otto et al. |
| 8,676,481 B2 | 3/2014 | Coulmeau et al. |
| 9,310,222 B1 | 4/2016 | Suiter |
| 10,096,253 B2 | 10/2018 | Moravek et al. |
| 10,109,203 B2 * | 10/2018 | Chmelarova ............ G08G 5/21 |
| 10,540,899 B2 | 1/2020 | Moravek et al. |
| 10,977,950 B2 | 4/2021 | Agam et al. |
| 11,393,343 B2 | 7/2022 | Litvova et al. |
| 2010/0042316 A1 | 2/2010 | Caillaud |
| 2010/0161156 A1 | 6/2010 | Coulmeau et al. |
| 2013/0179059 A1 | 7/2013 | Otto et al. |
| 2014/0309821 A1* | 10/2014 | Poux ..................... G08G 5/58 |
| | | 701/14 |
| 2017/0154537 A1* | 6/2017 | Moravek ................ G08G 5/34 |
| 2018/0068569 A1 | 3/2018 | Chmelarova et al. |
| 2018/0102056 A1 | 4/2018 | Leber et al. |
| 2018/0144643 A1 | 5/2018 | Moravek et al. |
| 2018/0366010 A1 | 12/2018 | Agam et al. |
| 2020/0273350 A1 | 8/2020 | Litvova et al. |
| 2022/0204180 A1 | 6/2022 | Sellmann et al. |

OTHER PUBLICATIONS

Extended European Search Report issued in European Patent Application No. 24179896.6, mailed on Oct. 14, 2024, 8 pages.

* cited by examiner

*Primary Examiner* — James J Lee
*Assistant Examiner* — David Hatch
(74) *Attorney, Agent, or Firm* — Alleman Hall & Tuttle LLP (57) ABSTRACT

The present disclosure provides for alternate destination selection and management onboard a vehicle. The alternate destination selection includes receiving, at a vehicle management system (VMS) an alternate destination request selecting and determining a plurality of navigation estimates based on the request and updating the VMS according to the alternate destination and the plurality of navigation estimates.

20 Claims, 5 Drawing Sheets

ALTERNATE DESTINATION MANAGEMENT AND SELECTION

FIELD

Aspects of the present disclosure relate to vehicle navigation and destination management. The systems and methods herein provide alternate destination to pilots and navigators etc. via a vehicle management system.

BACKGROUND

A diversion refers to a change in a flight plan that affects the destination of the flight (i.e., where and when the aircraft actually lands). For example, an aircraft originally destined for airport A may divert to airport B when airport A is experiencing inclement weather, is experiencing runway congestion, etc., or when the aircraft is low on fuel, when technical difficulties occur, when a person on board the aircraft is experiencing a medical issue, etc. While diversions may be instituted and implemented by flight controllers or other actors outside of an aircraft, pilots may also institute diversions by selecting an alternate destination. Alternate Destinations functions of a Flight Management System are highly dependent on manual pilot entries and interaction. This function only depicts information related to airports that are near the aircraft current position or information about locations that are manually entered by the crew. Providing safe and automated alternate destination selection remains a challenge.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. The method includes: receiving, at a vehicle management system (VMS) on board a vehicle, an alternate destination request, determining, at the VMS, a location of interest based on the alternate destination request, selecting at least one alternate destination based on a proximity of the at least one alternate destination to the location of interest, and determining a plurality of navigation estimates for the vehicle based on a current vehicle location, a location of the at least one alternate destination, and current vehicle conditions, and updating the VMS according to the at least one alternate destination and the plurality of navigation estimates. Other embodiments of this aspect include corresponding computer systems, apparatus, and computer programs recorded on one or more computer storage devices, each configured to perform the actions of the methods.

Implementations may include one or more of the following features. The method where receiving the alternate destination request may include: receiving a user selection from a user via a user interface (UI) of the VMS, where the user selection may include the location of interest selected by the user, where the location of interest may include one of: an original destination for the vehicle during a navigation session, and a custom location selected by the user.

In one aspect, in combination with any example method above or below, the vehicle may include an aircraft, and where the VMS may include an onboard flight management system.

In one aspect, in combination with any example method above or below, the at least one alternate destination may include a plurality of nearest airports nearest to the location of interest, and where determining the plurality of navigation estimates may include for each airport of the plurality of nearest airports one or more of: determining a flight distance between the current vehicle location of the aircraft and the airport, determining an estimated time of arrival (ETA) for a flight from the current vehicle location to the airport, and determining an estimated remaining fuel level upon arrival of the aircraft at the airport.

In one aspect, in combination with any example method above or below, the method may include: at an update time, updating the plurality of navigation estimates based on an updated location of the aircraft at the update time.

In one aspect, in combination with any example method above or below, the current vehicle conditions may include: environmental and physical conditions at the current vehicle location, and vehicle operational conditions for the vehicle.

In one aspect, in combination with any example method above or below, the method may include receiving an additional options selection at the VMS, selecting a next plurality of nearest airports nearest to the location of interest, and determining a next plurality of navigation estimates for each airport of the next plurality of nearest airports.

In one aspect, in combination with any example method above or below, updating the VMS according to the at least one alternate destination and the plurality of navigation estimates may include displaying the at least one alternate destination and the plurality of navigations estimates on a user interface (UI) of the VMS.

In one aspect, in combination with any example method above or below, updating the VMS according to the at least one alternate destination and the plurality of navigation estimates may include: selecting a new destination from the at least one alternate destination based on the plurality of navigations estimates, replacing an original destination in an autopilot navigation subsystem of the VMS with the selected new destination, and displaying the new destination and the plurality of navigations estimates on a user interface (UI) of the VMS. Implementations of the described techniques may include hardware, a method or process, or computer software on a computer-accessible medium.

One general aspect includes a system. The system includes a processor, and a memory storage device including instructions that when executed by the processor perform an operation that may include: receiving, at a vehicle management system (VMS) on board a vehicle, an alternate destination request, determining, at the VMS, a location of interest based on the alternate destination request, selecting at least one alternate destination based on a proximity of the at least one alternate destination to the location of interest, and determining a plurality of navigation estimates for the vehicle based on a current vehicle location, a location of the at least one alternate destination, and current vehicle conditions, and updating the VMS according to the at least one alternate destination and the plurality of navigation estimates.

Implementations may include one or more of the following features. The system where receiving the alternate destination request may include: receiving a user selection from a user via a user interface (UI) of the VMS, where the user selection may include the location of interest selected by the user, where the location of interest may include one of: an original destination for the vehicle during a navigation session, and a custom location selected by the user.

In one aspect, in combination with any example system above or below, the vehicle may include an aircraft, and where the VMS may include an onboard flight management system.

In one aspect, in combination with any example system above or below, the at least one alternate destination may include a plurality of nearest airports nearest to the location of interest, and where determining the plurality of navigation estimates may include for each airport of the plurality of nearest airports one or more of: determining a flight distance between the current vehicle location of the aircraft and the airport, determining an estimated time of arrival (ETA) for a flight from the current vehicle location to the airport, and determining an estimated remaining fuel level upon arrival of the aircraft at the airport.

In one aspect, in combination with any example system above or below, the operation may include: at an update time, updating the plurality of navigation estimates based on an updated location of the aircraft at the update time One general aspect includes a computer readable storage device including instructions that when executed by a processor of a processing system perform an operation. The operation includes receiving, at a vehicle management system (VMS) on board a vehicle, an alternate destination request, determining, at the VMS, a location of interest based on the alternate destination request, selecting at least one alternate destination based on a proximity of the at least one alternate destination to the location of interest, and determining a plurality of navigation estimates for the vehicle based on a current vehicle location, a location of the at least one alternate destination, and current vehicle conditions, and updating the VMS according to the at least one alternate destination and the plurality of navigation estimates.

Implementations may include one or more of the following features. The computer readable storage device where receiving the alternate destination request may include: receiving a user selection from a user via a user interface (UI) of the VMS, where the user selection may include the location of interest selected by the user, where the location of interest may include one of: an original destination for the vehicle during a navigation session, and a custom location selected by the user.

In one aspect, in combination with any example computer readable storage device above or below, the vehicle may include an aircraft, and where the VMS may include an onboard flight management system. In one aspect, in combination with any example computer readable storage device above or below, the at least one alternate destination may include a plurality of nearest airports nearest to the location of interest, and where determining the plurality of navigation estimates may include for each airport of the plurality of nearest airports one or more of: determining a flight distance between the current vehicle location of the aircraft and the airport, determining an estimated time of arrival (ETA) for a flight from the current vehicle location to the airport, and determining an estimated remaining fuel level upon arrival of the aircraft at the airport.

In one aspect, in combination with any example computer readable storage device above or below, the operation may include: at an update time, updating the plurality of navigation estimates based on an updated location of the aircraft at the update time.

In one aspect, in combination with any example computer readable storage device above or below, the current vehicle conditions may include environmental and physical conditions at the current vehicle location, and vehicle operational conditions for the vehicle.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to systems and methods for alternate destination selection and management, using user inputs, flight tracking data (e.g., ADS-B (Automatic Dependent Surveillance-Broadcast) data), vehicle operation conditions (e.g., current weight, fuel levels, and aircraft performance data, airport operational data, and weather data in real-time to identify alternate destinations onboard an aircraft.

Figure 1:
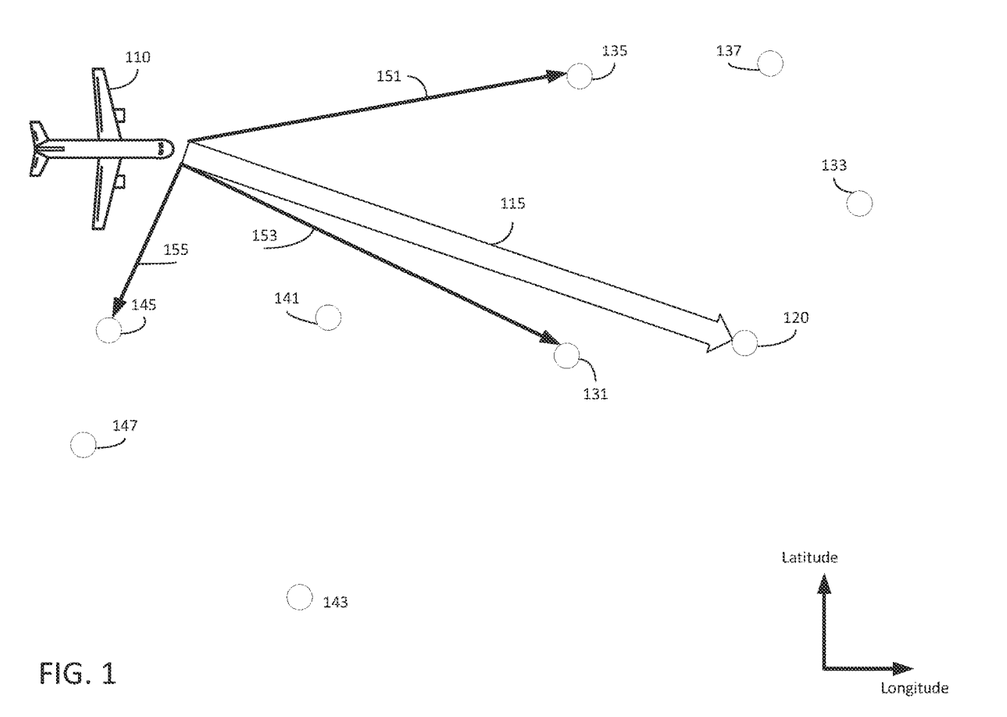
FIG. 1 is a flightpath for an aircraft, according to aspects of the present disclosure.

FIG. 1 is a flightpath for an aircraft, according to aspects of the present disclosure. For example, aircraft 110 is traveling along a flightpath 115 to an original destination 120. In some examples, a pilot aboard the aircraft 110 may wish to identify alternate destinations other than the original destination. For example, the destinations 131-137 and 141-147 may provide alternate airport(s) or landing runways where the aircraft 110 may end its flight. In some examples, the pilot aboard the aircraft 110 may also wish to identify various information about alternate flight paths to the alternates destinations. For example, the pilot may also wish to identify information related to the flight paths 151, 153, and 155. The systems and methods described herein provide further detail in identifying the alternate destinations and providing various details about the destination.

Figure 2:
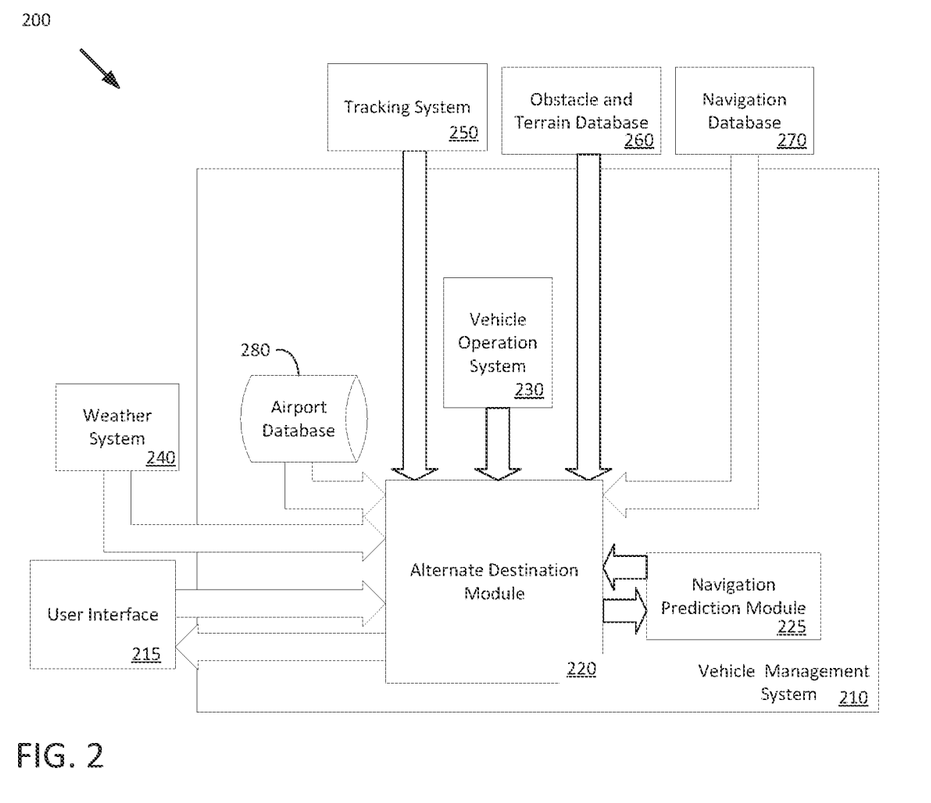
FIG. 2 illustrates a vehicle management system, according to aspects of the present disclosure.

FIG. 2 illustrates a vehicle management environment 200, according to aspects of the present disclosure. A vehicle management system (VMS) 210 is provided on a computing device, (such as a computing device 500, which is discussed in greater detail herein in regard to FIG. 5) to provide vehicle management, including navigational and operational control, to a vehicle such as the aircraft 110 and to proactively identify alternate destinations and manage flights selected for diversion to an alternate destination. The VMS 210 is in communication with a navigation and tracking system 250, a weather system 240, and a user interface 215, which may be included on the same computing device as the VMS 210 and/or one another, or on separate computing devices. Additionally, although illustrated as individual systems, each of the VMS 210, navigation and tracking system 250, weather system 240, and user interface 215 may represent one or a plurality of individual systems of the indicated type which may be provided by an individual computing device or by a distributed computing environment. When provided by separate devices, the various systems are communicatively connected to one another by one or more of a wireless or wired network, broadcast services, and beamed services (e.g., directed satellite communication and microwave point-to-point communications).

The navigation and tracking system 250 provides flight tracking data the aircraft, such as the aircraft 110, and the VMS 210 is onboard the aircraft 110. In various aspects, the tracking data may include ADS-B data, radar positioning data, transponder data, and other data that indicate where an aircraft is located (including altitude), the heading of the aircraft, and the speed at which the aircraft is traveling. For ADS-B data, the individual aircraft receive satellite positioning information to determine where that aircraft is currently located and the current velocity of that aircraft, which the individual aircraft broadcast for reception by the tracking system 250.

In some aspects, the tracking data further identifies the particular aircraft (e.g., flight X operated by airline A), the type of aircraft and the operator of the aircraft, which the VMS 210 can correlate to known aircraft characteristics (e.g., carries X passengers, requires a runway at least Y m long, uses facilities in general aviation or associated with airline A or C (but not B)), the origin and destination (and any known waypoints) for the current (or original) flight plan for the aircraft, etc. These flight tracking data may further provide deviation data from the original flight plan; indicating to what extent the aircraft is off course (including flying at a different altitude than originally planned), ahead or behind of schedule, flying faster or slower than originally planned, or being directed to a different destination than originally planned.

The weather system 240 receives current weather data and weather forecast data (collectively, weather data) correlated to various locations in the zone the aircraft or the flightpath 115. In various aspects, the weather data include METAR (Meteorological Aerodrome Reports) data, Terminal Aerodrome Forecasts (TAF) data, and other current, short-term, or long-term sets of information related to localized weather. The weather data may indicate one or more of: temperature; humidity; wind speed; chance of, amount of, and type of precipitation (e.g., rain, snow, hail); chance of lightning; and ground based conditions that may affect air patterns (e.g., volcanic eruptions, forest fires, floods), to name a few examples. The user interface 215 represents the computing systems including guided user interfaces (GUIs) of one or more aircrews (e.g., pilots, copilots, navigators, etc.).

The user interface 215 can indicate to the VMS 210 various requirements or reasons behind an alternate destination request including a custom location. The VMS 210 will determine and recommend airports as alternate destinations with appropriate resources to provide a safe landing and to resolve a diversion issue (e.g., medical or maintenance teams and facilities at or nearby the selected airport). The VMS 210, in turn, uses the received flight tracking data, weather data, knowledge of the airports in an airport database 280, and needs indicated by the user interface 215 (if indicated), to determine one or more "best" airports to present as an alternate destination and to divert the aircraft to, which are provided in a recommendation or alert to the user interface 215 to select as the new destination for a flight.

The VMS 210 includes an airport database 280 that identifies what resources (e.g., number and lengths of runways, numbers and types of gates/terminals, maintenance facilities, fuel capacity, hangar space, customs stations) are available at each airport, and what services are located nearby each airport (e.g., ground transportation options, lodging options, medical services), and where each airport is located. End users may update, or a provider of the VMS 210 may curate, the airport database 280 to reflect the most recent conditions for one or more airports (e.g., when a new runway is opened, when a terminal is closed for remodeling).

An alternate destination module 220 receives the weather data, flight tracking data, and airport database 280 to determine a number of alternate destinations. The navigation prediction module 225 predicts or calculates various metrics including determining a flight distance between the current vehicle location of the aircraft and an alternate destination. In some examples, the flight distance between the current vehicle location is based on a direct to distance or a missed approach distance as selected by a crew member aboard the aircraft 110 or other entity (e.g., an airline operations center, etc.). The alternate destination module may also determine an estimated time of arrival (ETA) for a flight from the current vehicle location to the alternate destination, determine an estimated remaining fuel level upon arrival of the aircraft at the alternate destination, and determine various other metrics needed to complete a flight path between a current location and an alternate destination (e.g., a trip altitude, optimum altitude, etc.).

Figure 3:
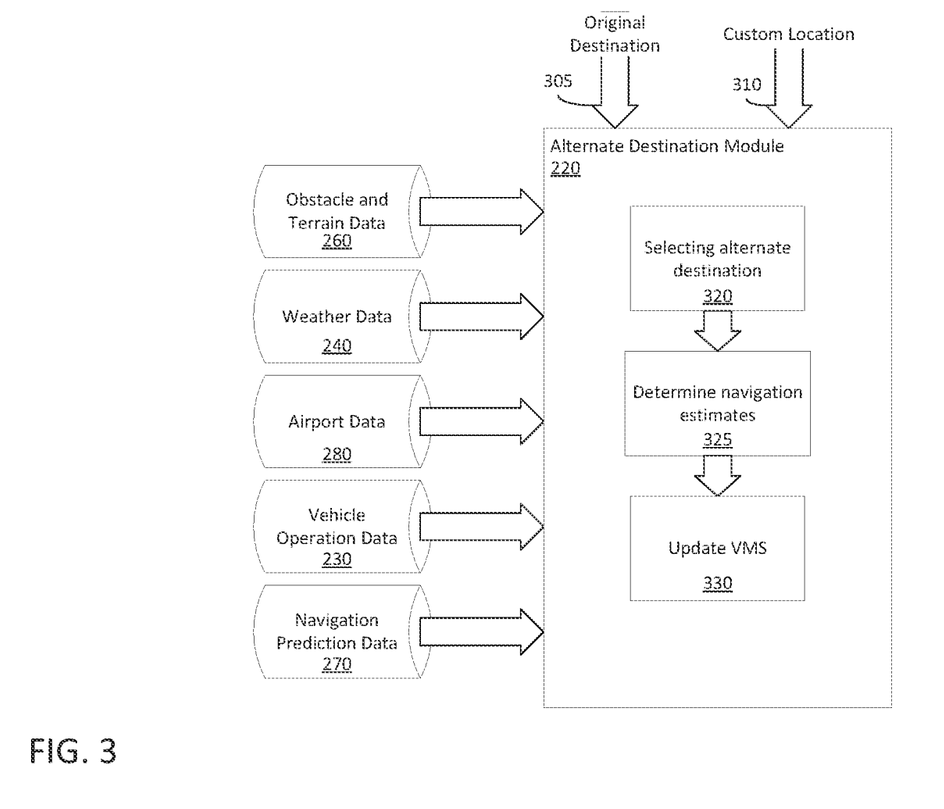
FIG. 3 illustrates a detailed view of the alternate destination module, according to aspects of the present disclosure.

FIG. 3 illustrates a detailed view of the alternate destination module 220, according to aspects of the present disclosure. When active, the alternate destination module 220 may receive, for example, airport data, weather data, and flight tracking data from the tracking system 250, vehicle operation system 230 data, obstacle and terrain data 260, navigation prediction data 270 and user inputs such as the original destination 305 or custom location 310. In various aspects, the alternate destination module 220 uses the most up-to-date data available for the live data, such as when a data feed is interrupted. An alternate destination module 320 selects an alternate destination based on the inputs, original destination 305 and custom location 310, and a navigation estimate module 325 calculate or determines a plurality of navigation estimates for each airport of the plurality of nearest airports, and a update module 330 updates the VMS 210 as described in more detail in relation to FIG. 4.

Figure 4:
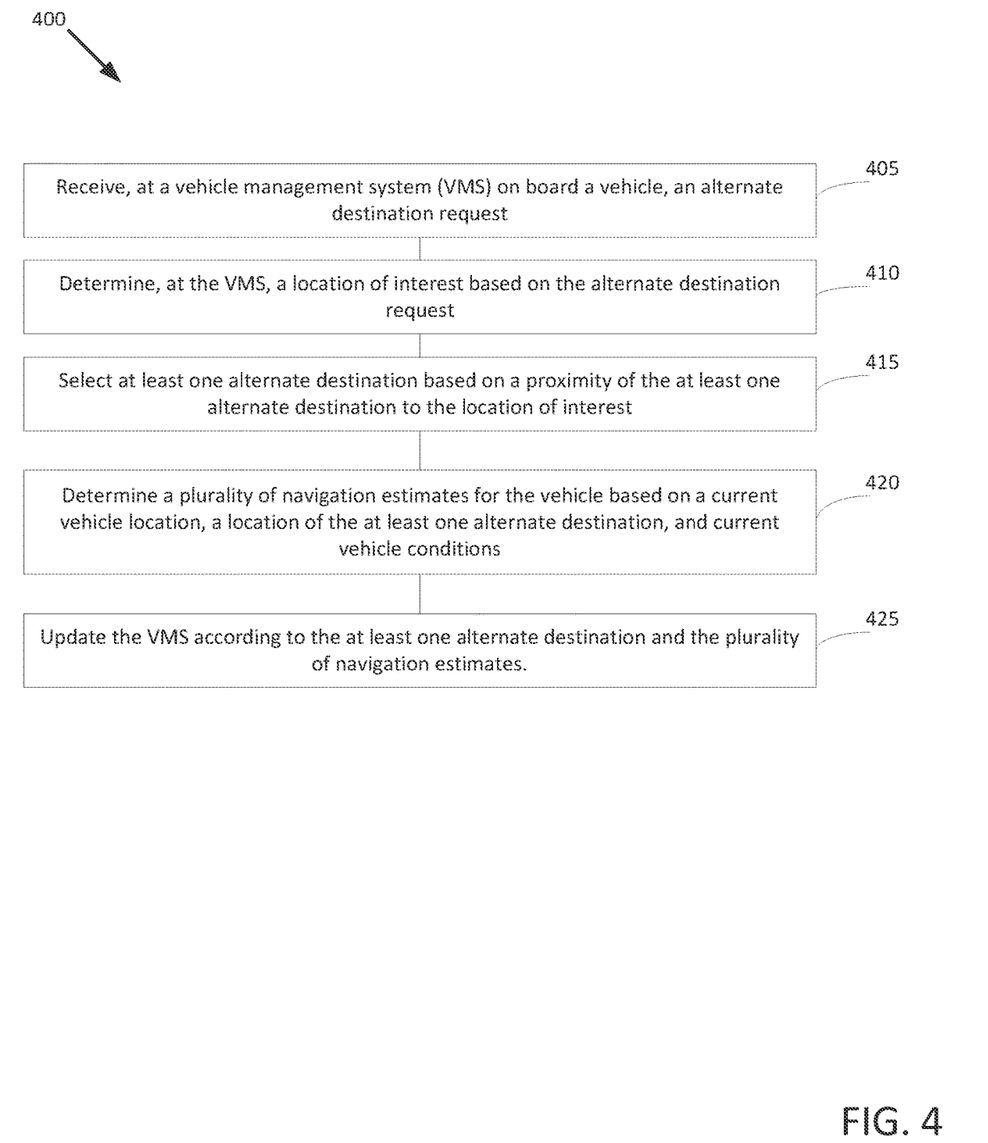
FIG. 4 is a flowchart of a method for alternate destination management, according to aspects of the present disclosure.

FIG. 4 is a flowchart of a method for alternate destination management, according to aspects of the present disclosure. Method 400 begins at block 405, where the VMS 210 onboard a vehicle receives an alternate destination request. In some examples, the vehicle is an aircraft, and the VMS is an onboard flight management system. For example, the VMS 210 receives an alternate destination request from a pilot via the user interface 215. In another example, the VMS 210, including the vehicle operation system 230 or other module may request an alternate destination. For example, the vehicle operation system 230 may request an earlier or different destination (e.g., alternate landing airport) based on the current vehicle or other conditions.

At block 410, the VMS 210 determines a location of interest based on the alternate destination request. For example, the VMS 210 may receive a user selection from a user via the user interface 215 of the VMS 210. The user selection may include the location of interest selected by the user, wherein the location of interest comprises one of: an original destination for the vehicle during a navigation session, such as original destination 305 and a custom location selected by the user, such as custom location 310.

At block 415, the VMS 210 selects at least one alternate destination based on a proximity of the at least one alternate destination to the location of interest. In some examples, the VMS 210 selects a plurality of nearest airports nearest to the location of interest. For example, the VMS selects the alternate destinations, destinations 131-137, nearest the original destination 120 or selects the alternate destinations 143-147 based on a custom location such as the alternate destination 141.

At block 420, the VMS 210 determines a plurality of navigation estimates for the vehicle based on a current vehicle location, a location of the at least one alternate destination, and current vehicle conditions (e.g., environmental and physical conditions at the current vehicle location and vehicle operational conditions for the vehicle). For example, for each airport of the plurality of nearest airports, the VMS 210 determines a flight distance between the current vehicle location of the aircraft and the airport, determines an estimated time of arrival (ETA) for a flight from the current vehicle location to the airport, and determines an estimated remaining fuel level upon arrival of the aircraft at the airport. In one example, the VMS 210 may also determine a flight distance based on missed approach calculation. For the missed approach, the VMS 210 calculates the distance from a current position to the active or original destination (following the active flight plan), plus the missed approach procedure in the active destination, and plus the distance from the active destination to the alternate destination airport.

In some examples, at an update time after the initial calculations, the VMS 210 may update the plurality of navigation estimates based on an updated location of the aircraft at the update time. Additionally, the VMS may receive an additional options selection at the VMS (e.g., a pilot selects a next option on the user interface), select a next plurality of nearest airports nearest to the location of interest, and determine a next plurality of navigation estimates for each airport of the next plurality of nearest airports.

At block 425, the VMS 210 updates the VMS according to the at least one alternate destination and the plurality of navigation estimates. For example, the VMS 210 displays the at least one alternate destination and the plurality of navigations estimates on a user interface (UI) of the VMS. In some examples, the VMS 210 selects a new destination from the at least one alternate destination based on the plurality of navigations estimates, replaces an original destination in an autopilot navigation subsystem of the VMS with the selected new destination, and displays the new destination and the plurality of navigations estimates on a user interface (UI) of the VMS.

Figure 5:
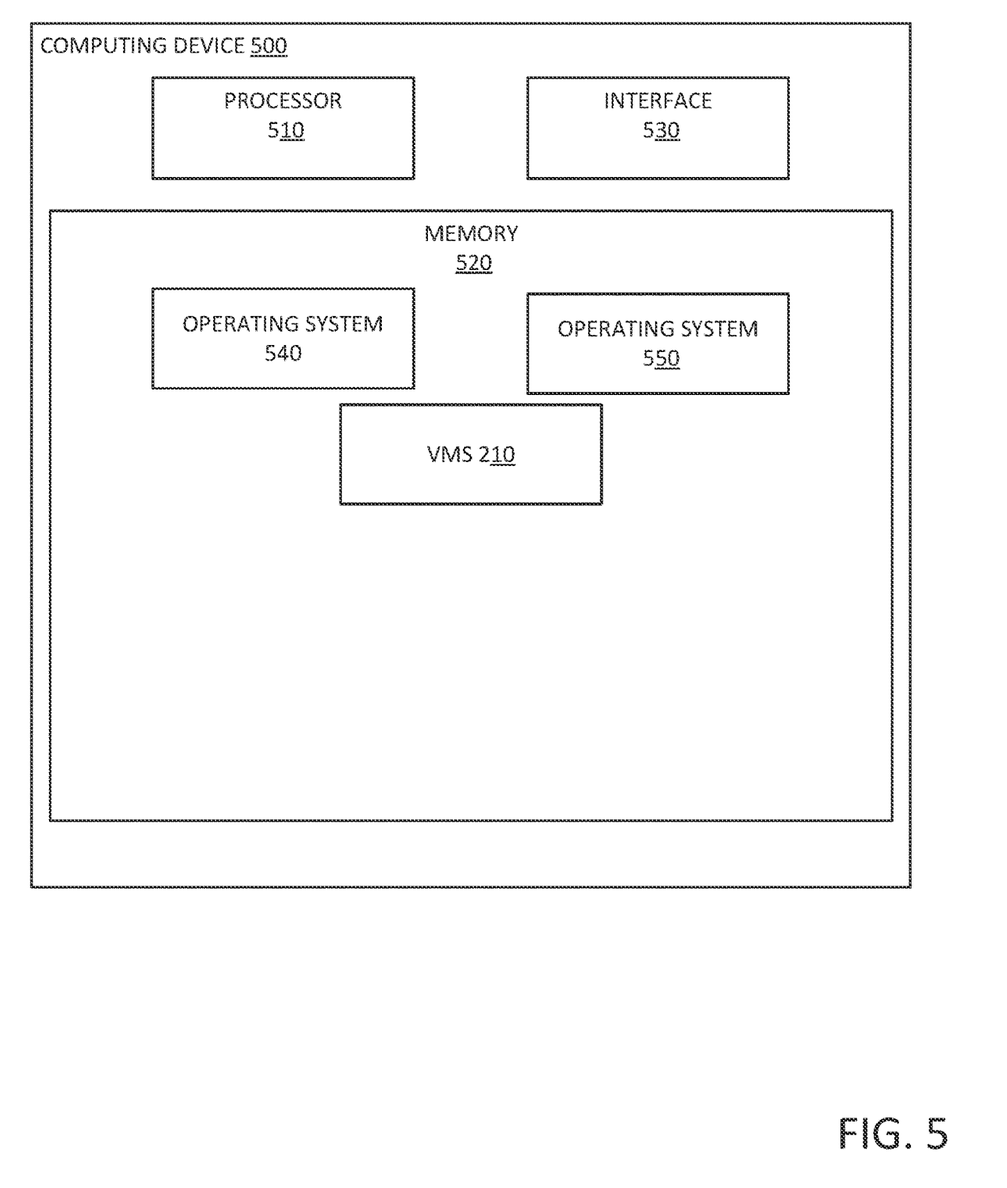
FIG. 5 illustrates example computing components of a computing system as may be used to provide alternate destinations, according to aspects of the present disclosure.

FIG. 5 illustrates example computing components of a computing device 500 or other computer readable storage device or processing system as may be used to provide alternate destination management as described in the present disclosure.

The computing device 500 includes a processor 510, a memory 520, and an interface 530. The processor 510 and the memory 520 provide computing functionality to run the various modules to process real-time data and output alternate destinations, diversion alerts, and various alternate destination information such as alternate destination (airport) name, ETA, fuel remaining, etc.

The processor 510, which may be any computer processor capable of performing the functions described herein, executes commands based on inputs received from a user and the data received from the interface 530.

The interface 530 connects the computing device 500 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 530 is used to receive the live data and to output alternate destination recommendations.

The memory 520 is a memory storage device that generally includes various processor-executable instructions, that when executed by the processor 510, perform the various functions related to predictive flight diversion management discussed herein. The processor-executable instructions may generally be described or organized into various "applications" or "modules" in the memory 520, although alternate implementations may have different functions and/or combinations of functions. The memory 520 also generally includes data structures that store information for use by or output by the various applications or modules. In the present disclosure, the memory 520 includes at least instructions for an operating system 540 and one or more application(s) 550. The memory 520 may be one or more memory devices, such as, for example, Random Access Memory (RAM), Read Only Memory (ROM), flash memory, or any other type of volatile or non-volatile storage medium that includes instructions that the processor 510 may execute.

When the computing device 500 provides the functionality of the VMS 210, the memory 520 includes processor executable instructions to provide an application for the VMS 210 and provide the functionalities described in the present disclosure. In some aspects, the memory 520 includes also databases described herein.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   receiving, at a vehicle management system (VMS) on board a vehicle, an alternate destination request;
   determining, at the VMS, a location of interest based on the alternate destination request;
   selecting at least one alternate destination based on a proximity of the at least one alternate destination to the location of interest;
   determining a plurality of navigation estimates for the vehicle based on a current vehicle location, a location of the at least one alternate destination, and current vehicle conditions; and
   updating the VMS according to the at least one alternate destination and the plurality of navigation estimates.

2. The method of claim 1, wherein receiving the alternate destination request comprises:
   receiving a user selection from a user via a user interface (UI) of the VMS, wherein the user selection comprises the location of interest selected by the user, wherein the location of interest comprises one of:
   an original destination for the vehicle during a navigation session; and
   a custom location selected by the user.

3. The method of claim 1, wherein the vehicle comprises an aircraft, and wherein the VMS comprises an onboard flight management system.

4. The method of claim 3, wherein the at least one alternate destination comprises a plurality of nearest airports nearest to the location of interest, and wherein determining the plurality of navigation estimates comprises for each airport of the plurality of nearest airports one or more of:
   determining a flight distance between the current vehicle location of the aircraft and the airport;
   determining an estimated time of arrival (ETA) for a flight from the current vehicle location to the airport; and
   determining an estimated remaining fuel level upon arrival of the aircraft at the airport.

5. The method of claim 4, further comprising:
   at an update time, updating the plurality of navigation estimates based on an updated location of the aircraft at the update time.

6. The method of claim 4, wherein the current vehicle conditions comprise:
   environmental and physical conditions at the current vehicle location; and
   vehicle operational conditions for the vehicle.

7. The method of claim 4, further comprising:
   receiving an additional options selection at the VMS;
   selecting a next plurality of nearest airports nearest to the location of interest; and
   determining a next plurality of navigation estimates for each airport of the next plurality of nearest airports.

8. The method of claim 1, wherein updating the VMS according to the at least one alternate destination and the plurality of navigation estimates comprises:

displaying the at least one alternate destination and the plurality of navigations estimates on a user interface (UI) of the VMS.

9. The method of claim 1, wherein updating the VMS according to the at least one alternate destination and the plurality of navigation estimates comprises:
selecting a new destination from the at least one alternate destination based on the plurality of navigations estimates;
replacing an original destination in an autopilot navigation subsystem of the VMS with the selected new destination; and
displaying the new destination and the plurality of navigations estimates on a user interface (UI) of the VMS.

10. A system, comprising:
a processor; and
a memory storage device including instructions that when executed by the processor perform an operation comprising:
receiving, at a vehicle management system (VMS) on board a vehicle, an alternate destination request;
determining, at the VMS, a location of interest based on the alternate destination request;
selecting at least one alternate destination based on a proximity of the at least one alternate destination to the location of interest;
determining a plurality of navigation estimates for the vehicle based on a current vehicle location, a location of the at least one alternate destination, and current vehicle conditions; and
updating the VMS according to the at least one alternate destination and the plurality of navigation estimates.

11. The system of claim 10, wherein receiving the alternate destination request comprises:
receiving a user selection from a user via a user interface (UI) of the VMS, wherein the user selection comprises the location of interest selected by the user, wherein the location of interest comprises one of:
an original destination for the vehicle during a navigation session; and
a custom location selected by the user.

12. The system of claim 10, wherein the vehicle comprises an aircraft, and wherein the VMS comprises an onboard flight management system.

13. The system of claim 12, wherein the at least one alternate destination comprises a plurality of nearest airports nearest to the location of interest, and wherein determining the plurality of navigation estimates comprises for each airport of the plurality of nearest airports one or more of:
determining a flight distance between the current vehicle location of the aircraft and the airport;
determining an estimated time of arrival (ETA) for a flight from the current vehicle location to the airport; and
determining an estimated remaining fuel level upon arrival of the aircraft at the airport.

14. The system of claim 13, further comprising:
at an update time, updating the plurality of navigation estimates based on an updated location of the aircraft at the update time.

15. A non-transitory computer readable storage device including instructions that when executed by a processor of a processing system, cause the processing system to perform an operation comprising:
receiving, at a vehicle management system (VMS) on board a vehicle, an alternate destination request;
determining, at the VMS, a location of interest based on the alternate destination request;
selecting at least one alternate destination based on a proximity of the at least one alternate destination to the location of interest;
determining a plurality of navigation estimates for the vehicle based on a current vehicle location, a location of the at least one alternate destination, and current vehicle conditions; and
updating the VMS according to the at least one alternate destination and the plurality of navigation estimates.

16. The non-transitory computer readable storage device of claim 15, wherein receiving the alternate destination request comprises:
receiving a user selection from a user via a user interface (UI) of the VMS, wherein the user selection comprises the location of interest selected by the user, wherein the location of interest comprises one of:
an original destination for the vehicle during a navigation session; and
a custom location selected by the user.

17. The non-transitory computer readable storage device of claim 15, wherein the vehicle comprises an aircraft, and wherein the VMS comprises an onboard flight management system.

18. The non-transitory computer readable storage device of claim 17, wherein the at least one alternate destination comprises a plurality of nearest airports nearest to the location of interest, and wherein determining the plurality of navigation estimates comprises for each airport of the plurality of nearest airports one or more of:
determining a flight distance between the current vehicle location of the aircraft and the airport;
determining an estimated time of arrival (ETA) for a flight from the current vehicle location to the airport; and
determining an estimated remaining fuel level upon arrival of the aircraft at the airport.

19. The non-transitory computer readable storage device of claim 18, further comprising:
at an update time, updating the plurality of navigation estimates based on an updated location of the aircraft at the update time.

20. The non-transitory computer readable storage device of claim 18, wherein the current vehicle conditions comprise:
environmental and physical conditions at the current vehicle location; and
vehicle operational conditions for the vehicle.

* * * * *